United States Patent [19]

Ona et al.

[11] Patent Number: 4,541,936

[45] Date of Patent: Sep. 17, 1985

[54] METHOD AND SILOXANE COMPOSITION FOR TREATING FIBERS

[75] Inventors: Isao Ona; Masaru Ozaki, both of Chiba, Japan

[73] Assignee: Toray Silicone Company, Ltd., Tokyo, Japan

[21] Appl. No.: 642,467

[22] Filed: Aug. 20, 1984

[30] Foreign Application Priority Data

Sep. 16, 1983 [JP]  Japan ................... 58-170779

[51] Int. Cl.$^4$ .................... D06M 13/02; D06M 13/08
[52] U.S. Cl. ................... 252/8.6; 252/8.8; 252/8.9; 252/174.15; 252/DIG. 1; 556/457; 556/465
[58] Field of Search ........... 252/DIG. 1, 8.9, 8.8, 252/8.6, 174.15; 556/457, 465

[56] References Cited

U.S. PATENT DOCUMENTS

| | | | |
|---|---|---|---|
| 3,296,199 | 1/1967 | Murphy | 260/46.5 |
| 3,558,556 | 1/1971 | Berger | 260/46.5 |
| 3,584,026 | 6/1971 | Berger | 260/448.2 |
| 3,702,859 | 11/1972 | Pittman et al. | 260/448.2 B |
| 3,876,459 | 4/1975 | Burrill | 117/141 |
| 3,980,599 | 9/1976 | Kondo et al. | 260/29.2 |
| 4,098,701 | 7/1978 | Burrill et al. | 252/8.6 |
| 4,247,592 | 1/1981 | Kalinowski | 428/266 |
| 4,359,545 | 11/1982 | Ona et al. | 524/262 |
| 4,387,177 | 6/1983 | Mine et al. | 524/425 |
| 4,388,437 | 6/1983 | Ona | 524/588 |
| 4,421,796 | 12/1983 | Burrill | 427/387 |
| 4,448,810 | 5/1984 | Westall | 427/302 |

FOREIGN PATENT DOCUMENTS

| | | |
|---|---|---|
| 099166 | 9/1973 | Japan . |
| 1034782 | 7/1966 | United Kingdom . |
| 1296136 | 11/1972 | United Kingdom . |
| 1598845 | 9/1981 | United Kingdom . |
| 2075040 | 11/1981 | United Kingdom . |

*Primary Examiner*—Paul Lieberman
*Assistant Examiner*—Willie Thompson
*Attorney, Agent, or Firm*—George A. Grindahl

[57] ABSTRACT

An aqueous emulsion comprising an aminoorgano-substituted organopolysiloxane fluid, a silane which bears a hydrophilic group, one or more surfactants and water are useful for treating fibers, such as thread, yard and textiles. When applied to a fiber and heated the composition undergoes a curing reaction and durably imparts desirable properties, such as excellent hand and moisture absorbability, to the fiber.

7 Claims, No Drawings

METHOD AND SILOXANE COMPOSITION FOR TREATING FIBERS

BACKGROUND OF THE INVENTION

This invention describes a fiber treatment agent. More specifically, this invention describes a fiber treatment composition which can impart to fiber materials a durable antistaticity, moisture absorbability and perspiration absorbability, resistance to soiling, rebound elasticity, flexibility, smoothness, creaseproofness and compression recovery.

Various organopolysiloxanes and treatment agents composed of these organopolysiloxanes which can impart flexibility, smoothness, creaseproofness and recovery to fiber materials have been employed and proposed to date.

For example, a dimethylpolysiloxane oil and its emulsion have been employed to provide flexibility. Also, a treatment agent composed of a methylhydrogenpolysiloxane, a hydroxyl group-terminated dimethylpolysiloxane and a condensation reaction catalyst has been employed to provide durable flexibility, creaseproofness and recovery. Of more relevance to the present invention, Japanese Pat. No. 48-17514 [73-17514] describes a treatment agent composed of an organopolysiloxane which possesses at least 2 epoxy groups per molecule and an amino group-containing organopolysiloxane for imparting smoothness to organic synthetic fibers; Japanese Pat. No. 53-36079 [78-36079] describes a treatment agent composed of a hydroxyl group-terminated diorganopolysiloxane, an organosilane, which contains both amine and alkoxy groups in each molecule, and/or its partial hydrolyzate and condensate; Japanese Pat. Nos. 53-19715 [78-19715] and 53-19716 [-19716] describe a treatment agent composed of an aminoalkyltrialkoxysilane and an epoxy group-containing organopolysiloxane; and Japanese Kokai Pat. No. 53-98499 [78-98499] proposes a triorganosiloxy group-terminated diorganopolysiloxane which possesses at least 2 aminoalkyl groups per molecule.

However, the prior art treatment agents cited above exhibit various drawbacks. For example, the treatment agent in which the principal agent is a dimethylpolysiloxane oil provides an unsatisfactory creaseproofness and recovery and the flexibility and smoothness are not durable. The treatment agent in which a methylhydrogenpolysiloxane is the essential component does not undergo an adequate curing reaction in the absence of a catalyst while the life span of its treatment bath is short in the presence of a catalyst. Also, it generates a large amount of hydrogen gas which is a dangerous fire or explosion risk. The treatment agent in which the principal agents are an epoxy group-containing organopolysiloxane and an amino group-containing organopolysiloxane suffers from the generation of a large amount of static electricity due to friction, the ready adhesion of oily soils and a reduced moisture absorbability and perspiration absorbability in the treatment of underwear. In order to eliminate the above drawbacks, a hydrophilic surfactant, e.g., the salt of a sulfate ester of ricinoleic acid, Turkey red oil, polysiloxane-polyoxyalkylene copolymers or the polyoxyethylene adduct of higher alcohols, is conventionally added to the treatment agent. However, these surfactants are readily soluble in water or in the organic solvents used in dry cleaning and are easily removed by repeated washing with the result that they exhibit the drawback of a lack of durability.

BRIEF SUMMARY OF THE INVENTION

Various methods were examined by the present inventors in order to eliminate the drawbacks of prior art fiber treatment agents and a fiber treatment agent was discovered which can impart a durable antistaticity, moisture absorbability and perspiration absorbability, resistance to soiling, rebound elasticity, flexibility, smoothness, creaseproofness and compression recovery to fibers.

Briefly stated this discovery relates to an aqueous emulsion comprising a mixture of (a) an aminoorgano-substituted organopolysiloxane and (b) an alkoxysilane which bears certain hydrophilic groups and to a method for treating a fiber material therewith. The organopolysiloxane moiety of component (a) imparts flexibility and smoothness to fibers and the amino group of component (a) provides good absorption to fibers so that it imparts a smoothness, flexibility and lubricity. The alkoxy group of component (b) serves to crosslink component (b) with the hydroxyl or alkoxy end group of component (a) in order to impart "firmness", compression recovery and rebound elasticity to fabrics and its hydrophilic group provides antistaticity and perspiration absorbability.

DETAILED DESCRIPTION OF THE INVENTION

In one aspect the present invention relates to an emulsion composition obtained by mixing components consisting essentially of (a) 100 parts by weight of an organopolysiloxane having a viscosity at 25° C. of at least 10 centistokes and having the general formula

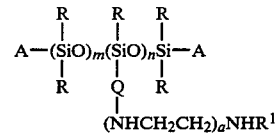

wherein R represents a monovalent hydrocarbon or halogenated hydrocarbon group having from 1 to 20 carbon atoms, $R^1$ represents a hydrogen atom or a monovalent hydrocarbon group, m and n are integers each with a value $\geq 1$, A represents a hydroxyl group or an alkoxy group having from 1 to 5 carbon atoms, Q represents a divalent hydrocarbon group and a is an integer with a value of 0 to 5, (b) 1 to 100 parts by weight of a silane having the general formula $(R^2)_3Si-Z-O-R^3$ wherein $R^2$ represents an alkoxy or alkoxyalkoxy group having from 1 to 5 carbon atoms, Z represents a divalent hydrocarbon group and $R^3$ represents a hydrogen atom, a hydroxyl group-containing alkyl group or a polyoxyalkylene group or a partial hydrolysis condensate of said silane, (c) 1 to 30 parts by weight of a surfactant selected from the group consisting of nonionic and cationic surfactants and (d) an emulsion-forming quantity of water.

In the formula for component (a) of the compositions of this invention each R represents a $C_{1-20}$ monovalent hydrocarbon or halogenated monovalent hydrocarbon group, such as alkyl, aryl, arylalkyl, alkaryl, alkenyl and cycloaliphatic groups and halogenated derivatives of these groups. Concrete examples of R include, but are not limited to, methyl, ethyl, propyl, butyl, pentyl, vinyl, 3,3,3-trifluoropropyl, cyclohexyl, chloropropyl, chloroisobutyl, phenyl and styryl. All the R groups in a single molecule need not be identical to each other. R is most commonly the methyl group, however, a combination of major amounts of the methyl group and minor amounts of other groups is also common.

In the formula for component (a) each $R^1$ represents a hydrogen atom or a monovalent hydrocarbon group, such as those denoted above for R, and A represents a hydroxyl group or a $C_{1-5}$ alkoxy group such as methoxy, typically, or ethoxy, which serves to crosslink component (a) with component (b).

In the formula for component (a) Q represents a divalent hydrocarbon group such as an alkylene group such as $-CH_2-$, $-CH_2CH_2-$, $-CH_2CH_2CH_2-$, $-CH(CH_3)CH_2-$ or, $-CH_2CH(CH_3)CH_2-$ or $-(CH_2)_4-$ or an arylene group such as $-(CH_2)_2C_6H_4-$. Propylene and isobutylene are the most typical cases. Both m and n are integers with values of $\geq 1$ and a is an integer with a value of 0 to 10, but it is usually 0 or 1.

Component (a) is preferably an aminofunctional methylsiloxane fluid having the formula

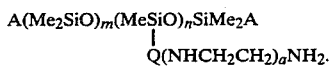

The viscosity of component (a) at 25° C. is at least 10 centistokes (cSt), preferably from about 100 to 5,000 cSt and most preferably is 200 to 500 cSt in order to provide flexibility, smoothness, compression recovery and creaseproofness to a fiber material treated therewith.

Component (a) is a well-known material in the organosilicon art and can be easily produced by the method described in U.S. Pat. No. 4,247,592 which is incorporated by reference. For example, an alkoxysilane with the general formula $H_2N(CH_2)_3Si(CH_3)(OCH_3)_2$ is hydrolyzed with excess water. The resulting hydrolysis condensation product is then equilibrated with a dimethylcyclopolysiloxane at elevated temperatures of 80 to 100° C. in the presence of a basic catalyst such as sodium hydroxide but in the absence of a chain terminating agent. The basic catalyst is neutralized with acid in the usual manner after the viscosity has reached the desired value.

In the formula for component (b) of the compositions of this invention each $R^2$ represents a $C_{1-5}$ alkoxy group such as methoxy, ethoxy, n-propoxy, isopropoxy, or an alkoxyalkoxy group such as methoxyethoxy. Methoxy and ethoxy are preferred $R^2$ groups. Component (b) preferably has the formula $(MeO)_3SiZOR^3$.

In the formula for component (b) Z represents a divalent hydrocarbon group, such as those denoted above for Q, and $R^3$ represents a hydrogen atom, a hydroxyl-group-containing alkyl groups such as $-CH_2CH_2OH$ or a polyoxyalkylene group, such as polyoxyethylene or polyoxypropylene or polyoxyethyleneoxypropylene.

Component (b) is readily produced by the addition reaction of a silane having the general formula $(R^2)_3SiH$, such as $(CH_3O)_3SiH$, with a compound having the general formula $CH_2=CH(CH_2)_{0-2}OR^3$, such as $CH_2=CHCH_2O(CH_2CH_2O)_{10}H$ in the presence of a hydrosilylation catalyst such as chloroplatinic acid. In addition, component (b) may be combined with a small quantity of water and then possibly heated in order to carry out its partial hydrolysis or condensation.

In the compositions of this invention component (c) is a surfactant which can emulsify component (a) in water and concrete examples thereof are polyoxyalkylene alkyl ethers, polyoxyalkylene alkylphenol ethers, polyoxyalkylene alkyl esters, sorbitan alkyl esters, polyoxyalkylene sorbitan alkylesters, aliphatic amine salts, quaternary ammonium salts, alkylpyridinium salts and mixtures of 2 or more of these compounds. The quantity of addition of component (c) must be adequate to emulsify component (a) and this quantity is usually 1 to 30 parts by weight per 100 parts by weight of component (a).

Water which comprises component (d) is added in sufficient amount to form the emulsion compositions of this invention and its quantity of addition is not further limited. Preferably the fiber treating compositions of this invention contain at least about 90 percent by weight water.

A composition of this invention is produced by combining the organopolysiloxane component (a) with the surfactant component (c) and water component (d) in order to produce an emusion which is combined with component (b) immediately prior to use. Alternatively, the above emulsion is combined with an aqueous solution of component (b) dissolved in an aqueous solution of component (c).

The compositions of this invention may be combined with an aliphatic acid salt of a metal such as tin, zinc, lead or cobalt as a condensation reaction catalyst.

In a second aspect the present invention relates to a method comprising (I) forming an emulsion composition by mixing components consisting essentially of (a) 100 parts by weight of an organopolysiloxane having a viscosity at 25° C. of at least 10 centistokes and having the general formula

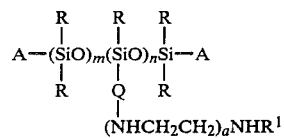

wherein R represents a monovalent hydrocarbon or halogenated hydrocarbon group having from 1 to 20 carbon atoms, $R^1$ represents a hydrogen atom or a monovalent hydrocarbon group, m and n are integers each with a value $\geq 1$, A represents a hydroxyl group or an alkoxy group having from 1 to 5 carbon atoms , Q represents a divalent hydrocarbon group and a is an integer with a value of 0 to 5, (b) 1 to 100 parts by weight of a silane having the general formula $(R^2)_3Si-Z-O-R^3$ wherein $R^2$ represents an alkoxy or alkoxyalkoxy group having from 1 to 5 carbon atoms, Z represents a divalent hydrocarbon group and $R^3$ represents a hydrogen atom, a hydroxyl group-containing alkyl group or a polyoxyalkylene group or a partial hydrolysis condensate of said silane, (c) 1 to 30 parts by weight of a surfactant selected from the group consisting of nonionic and cationic surfactants and (d) an emulsion-forming quantity of water, (II) applying the emulsion composition onto a fiber material and (III) heating the applied emulsion composition sufficiently to accelerate a crosslinking reaction between component (a) and component (b).

In the method of this invention the emulsion composition that is applied to a fiber material is any of the emulsion compositions of this invention delineated herein, including preferred embodiments thereof.

The composition is applied onto a fiber material by any suitable method, such as spraying or immersion, dried by standing at room temperature or by heating and then heat-treated in order to accelerate the crosslinking reaction between the amino group-containing organopolysiloxane and the alkoxysilane which thus imparts a durable antistaticity, moisture absorbability and perspiration absorbability, resistance to soiling, rebound elasticity, flexibility, smoothness, creaseproofness and compression recovery. Said heating typically can be done at 130° to 160° C. for 3 to 10 minutes.

Examples of fiber materials which can be treated by the method of this invention are natural fibers such as wool, silk, hemp, cotton and asbestos; regenerated fibers such as rayon and acetate; synthetic fibers such as polyester, polyamide, vinylon, polyacrylonitrile, polyethylene, polypropylene and spandex; glass fiber; carbon fiber and silicon carbide fiber. The form of the fiber material includes staple, filament, tow, yarns, weaves, knits, nonwovens and resin-processed fabrics. Filament, tow, weaves, knits, nonwovens and Japanese mattress cotton can be effectively treated by continuous methods.

This invention will be explained, but not limited, using demonstrational examples. "Parts" in the examples denote "parts by weight" and the viscosity was measured at 25° C.

EXAMPLE 1

A hydroxyl group-terminated dimethylpolysiloxane (495 parts; viscosity, 90 cSt) was combined with the hydrolysis condensate (5 parts; viscosity, 530 cSt) of a silane with the formula $CH_3(CH_3O)_2Si(CH_2)_3NHCH_2CH_2NH_2$ and sodium hydroxide (100 ppm) as a catalyst. The resulting mixture was equilibrated at 90° C. for 10 hours and then neutralized with 150 ppm acetic acid to obtain a hydroxyl group-terminated, amino group-containing organopolysiloxane (viscosity, 3,750 cSt) serving as a component (a) of the compositions of this invention.

This component (a) (30 parts) was emulsified with polyoxyethylene nonylphenol ether surfactant (5 parts), a cationic surfactant (1 part) with the formula $(CH_3)_3(C_{12}H_{25})N^{30}Cl^-$ and water (64 parts) using an emulsifier device to obtain a homogeneous starting emulsion.

The above starting emulsion was combined with an alkoxysilane (5 parts) with the formula $(CH_3O)_3Si(CH_2)_3O(C_2H_4O)_{15}H$ serving as a component (b) of the compositions of this invention which was then dissolved and dispersed to homogeneity. The emulsion was then diluted 10-fold with water to obtain a treatment composition of this invention.

A 65/35 polyester/cotton white broadcloth was immersed in the above treatment composition, removed from the composition, wrung out with a mangle roll to 1.5 wt. % applied organopolysiloxane, dried at 110° C. for 5 minutes and then heat-treated at 140° C. for 5 minutes in order to conduct the crosslinking reaction between the amino group-containing organopolysiloxane and the alkoxysilane.

For comparison examples, broadcloth was treated with an emulsion of only the amino group-containing organopolysiloxane used in this example or with an aqueous solution of only the alkoxysilane under the same conditions as above.

The resistance to washing, antistaticity and hand of the above broadcloth were tested.

The washing treatment comprised two dry cleanings and two water washes. Dry cleaning consisted of washing the treated or untreated cloth with perchloroethylene under agitation for 15 minutes and then drying. The water wash consisted of washing the cloth in an automatic reversing electric washer on the "high" setting for 15 minutes using a 0.5% wt % aqueous solution of Marseilles soap, rinsing and then drying. The percent organopolysiloxane remaining on the washed fabric was measured using a fluorescence X-ray analyzer (from Rigaku Denki Kogyo Co., Ltd.).

The antistaticity was measured as follows. Treated or untreated cloth was allowed to stand overnight at 20° C. under a relative humidity of 65%. The cloth was then triboelectrified with a cotton cloth (unbleached muslin No. 3) using a Kyodai Kaken rotary static tester at 800 rpm for 60 seconds. The resulting triboelectric potential was measured.

The hand was inspected by the feel to the hand and was characterized as either excellent (appropriate smoothness, rebound elasticity and firmness so that the hand is extremely good), fair (poor smoothness and rebound elasticity so that the hand is not good) or poor (absence of smoothness and rebound elasticity so that the hand is extremely poor).

The results for each measurement are reported in Table I. The measured values demonstrate that, compared with the comparison examples, a cloth which had been treated by the method of this invention retained an excellent antistaticity and hand even after it had been dry cleaned and washed twice each.

TABLE I

| Test Items | Cloth treated with fiber treatment agent of this invention | Untreated Cloth | Cloth treated with emulsion of only component (a) | Cloth treated with aqueous solution of only component (b) |
|---|---|---|---|---|
| Triboelectric potential (volts) | | | | |
| before washing | 1450 | 1880 | 3830 | 1250 |
| after washing | 1590 | 1830 | 2480 | 1630 |
| Hand | | | | |
| before washing | excellent | poor | excellent | poor |
| after washing | excellent | poor | fair | poor |
| % Organopolysiloxane remaining | 68 | — | 22 | 8 |

EXAMPLE 2

Octamethyltetrasiloxane (98 parts) was combined with the hydrolysis condensate (1.5 parts; viscosity, 350 cSt) of an alkoxysilane with the formula

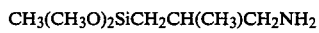

$CH_3(CH_3O)_2SiCH_2CH(CH_3)CH_2NH_2$ and with an alkoxysilane (0.5 parts) with the formula $(CH_3O)_2Si(CH_3)_2$ and sodium hydroxide (70 ppm) as the catalyst. The resulting mixture was equilibrated at 105° C. for 10 hours and then neutralized with 100 ppm acetic acid to synthesize a methoxy group-terminated, amino group-containing organopolysiloxane (950 cSt) with the following general formula to serve as a component (a) of the compositions of this invention.

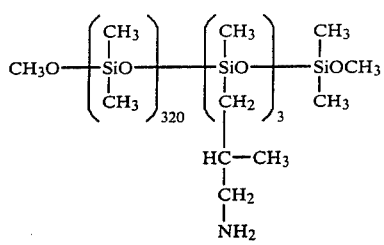

This component (a) (30 parts) was emulsified with a polyoxyalkylene nonylphenol ether surfactant (5 parts) and water (65 parts) using an emulsifier device to obtain a homogeneous starting emulsion.

This starting emulsion was combined with an alkoxysilane (10 parts) with the formula $(CH_3O)_3Si(CH_2)_3O(C_2H_4O)_{20}(C_3H_6O)_{20}CH_3$ as a component (b) of the composition of this invention and this was subsequently dissolved and dispersed to homogeneity. The resulting mixture was diluted 10-fold to prepare a treatment composition of this invention. A 100% cotton underwear knit was immersed in this treatment composition, wrung out with a mangle roll to 0.5% wt % adhered organopolysiloxane, dried at 110° C. for 10 minutes and then heat-treated at 140° C. for 5 minutes in order to conduct the crosslinking reaction between the amino group-containing organopolysiloxane and the alkoxysilane.

For comparison examples, 100% cotton underwear knits were treated with an emulsion of the amino group-containing organopolysiloxane alone or with an aqueous solution of the alkoxysilane alone under the same conditions as described above.

The treated cloth was spread on a flat table. One drop of water was placed on each spread-out cloth and the time in seconds for the absorption and disappearance of the water drop was measured to serve as a water absorption test. The hand and the percent residual organopolysiloxane were measured by the method described in Example 1. Washing was also conducted by the same method as above.

The results are reported in Table II. Cloth treated by the method of this invention retained an excellent water absorbability and hand even after it had been dry cleaned and washed twice each.

TABLE II

| Test Items | Cloth treated with fiber treatment agent of this invention | Untreated Cloth | Cloth treated with emulsion of only component (a) | Cloth treated with aqueous solution of only component (b) |
|---|---|---|---|---|
| Water absorbability (seconds) | | | | |
| before washing | 0 | 0 | ≧1200 | 0 |
| after washing | 0 | 0 | 420 | 0 |
| Hand | | | | |
| before washing | excellent | poor | excellent | poor |
| after washing | excellent | poor | fair | poor |
| % Organopolysiloxane remaining | 63 | — | 31 | 11 |

EXAMPLE 3

An alkoxysilane (100 parts) with the formula

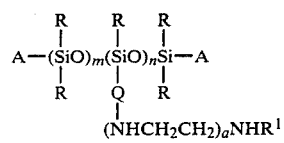

was combined with water (10 parts) and sodium hydroxide (50 ppm). The resulting mixture was allowed to stand at 50° C. for 7 hours, neutralized with 60 ppm acetic acid and then heated at 120° C. under a pressure of 7 mmHg in order to remove volatile components. The product was analyzed using a nuclear magnetic resonance analyzer from Hitachi Seisakusho Co., Ltd., in order to determine the ethoxy group hydrolysis ratio (%) which was found to be 66.8%. The product was thus confirmed to be a partial hydrolysis condensate. This partial hydrolysis condensate (10 parts) was combined with 100 parts of the starting emulsion comprising a component (a) of compositions of this invention from Example 2, dissolved and dispersed to homogeneity and then diluted 5-fold with water. A Tetron spun fiber for machine sewing was immersed in the above treatment composition, wrung out by centrifugal dewatering to 4 wt % applied composition, dried overnight at room temperature and then heat-treated at 150° C. for 5 minutes. The sewability was examined using an industrial sewing machine. Thread snapping, stitch dropping and sticking due to static electricity and inadequate lubricity were not observed. The sewability was thus excellent. These properties were retained even after the thread, which had been reeled up and placed in a washing bag, had been washed with water by the method described in Example 1.

That which is claimed is:

1. An emulsion composition obtained by mixing components consisting essentially of (a) 100 parts by weight of an organopolysiloxane having a viscosity at 25° C. of at least 10 centistokes and having the general formula

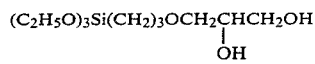

wherein R represents a monovalent hydrocarbon or halogenated hydrocarbon group having from 1 to 20 carbon atoms, $R^1$ represents a hydrogen atom or a monovalent hydrocarbon group, m and n are integers each with a value ≧ 1, A represents a hydroxyl group or an alkoxy group having from 1 to 5 carbon atoms, Q represents a divalent hydrocarbon group and a is an integer with a value of 0 to 5, (b) 1 to 100 parts by weight of a silane having the general formula $(R^2)_3Si$—Z—O—$R^3$, wherein $R^2$ represents an alkoxy or alkoxyalkoxy group having from 1 to 5 carbon atoms, Z represents a divalent hydrocarbon group and $R^3$ represents a hydrogen atom, a hydroxyl group-containing alkyl group or a polyoxyalkylene group or a partial hydrolysis condensate of said silane, (c) 1 to 30 parts by weight of a surfactant selected from the group consisting of nonionic and cationic surfactants and (d) an emulsion-forming quantity of water.

2. An emulsion composition according to claim 1 wherein component (a) has the formula

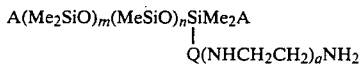

and component (b) has the formula $(MeO)_3SiZOR^3$.

3. An emulsion composition according to claim 2 wherein component (a) has a viscosity of from 100 to 5,000 centistokes at 25° C.

4. A method comprising (I) forming an emulsion composition by mixing components consisting essentially of (a) 100 parts by weight of an organopolysiloxane having a viscosity at 25° C. of at least 10 centistokes and having the general formula

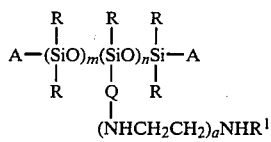

wherein R represents a monovalent hydrocarbon or halogenated group having from 1 to 20 carbon atoms, $R^1$ represents a hydrogen atom or a monovalent hydrocarbon group, m and n are integers each with a value $\geq$ 1, A represents a hydroxyl group or an alkoxy group having from 1 to 5 carbon atoms, Q represents a divalent hydrocarbon group and a is an integer with a value of 0 to 5, (b) 1 to 100 parts by weight of a silane having the general formula $(R^2)_3Si—Z—O—R^3$, wherein $R^2$ represents an alkoxy or alkoxyalkoxy group having from 1 to 5 carbon atoms, Z represents a divalent hydrocarbon group and $R^3$ represents a hydrogen atom, a hydroxyl group-containing alkyl group or a polyoxyalkylene group or a partial hydrolysis condensate of said silane, (c) 1 to 30 parts by weight of a surfactant selected from the group consisting of nonionic and cationic surfactants and (d) an emulsion-forming quantity of water, (II) applying the emulsion composition onto a fiber material and (III) heating the applied emulsion composition sufficiently to accelerate a crosslinking reaction between component (a) and component (b).

5. A method according to claim 4 wherein component (a) has the formula

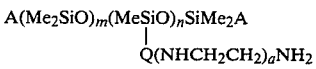

and component (b) has the formula $(MeO)_3SiZOR^3$.

6. A method according to claim 5 wherein component (a) has a viscosity of from 100 to 5,000 centistokes at 25° C.

7. A method according to claim 6 wherein the emulsion composition comprises at least 90% by weight water.

* * * * *

UNITED STATES PATENT AND TRADEMARK OFFICE
CERTIFICATE OF CORRECTION

PATENT NO. : 4,541,936

DATED : September 17, 1985

INVENTOR(S) : Isao Ona and Masaru Ozaki

It is certified that error appears in the above-identified patent and that said Letters Patent is hereby corrected as shown below:

In Col. 1, line 37, "[-19716]" should read --[78-19716]--.

In Col. 5, line 44, "$(CH_3)_3(C_{12}H_{25})N^{30}Cl^-$" should read -- $(CH_3)_3(C_{12}H_{25})N^+Cl^-$ --.

Signed and Sealed this

Twelfth Day of August 1986

[SEAL]

Attest:

DONALD J. QUIGG

Attesting Officer

Commissioner of Patents and Trademarks